Patented Feb. 8, 1944

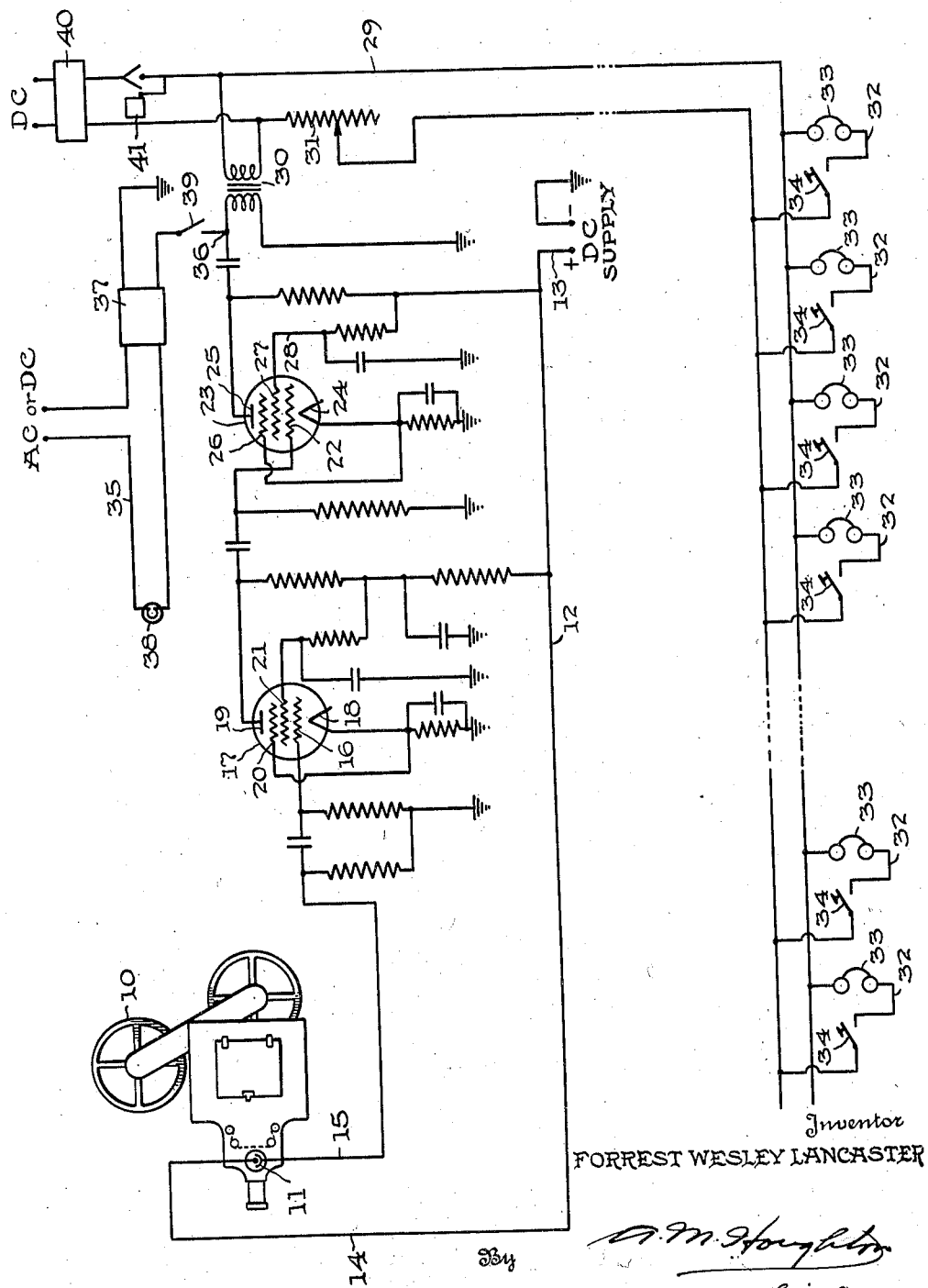

2,341,222

UNITED STATES PATENT OFFICE 2,341,222

APPARATUS FOR TEACHING TELEGRAPHY

Forrest Wesley Lancaster, Raleigh, N. C.

Application January 20, 1943, Serial No. 473,011

6 Claims. (Cl. 35—14)

This invention relates to apparatus for teaching telegraphy wherein moving images which convey instruction in the technique of code signalling are projected for observation by the student, and are synchronized with signal impulses which are received when a telegraph key is manipulated in coordination with the depicted actions. The visual instruction which requires harmonious response to the action viewed enables the student more readily to acquire dexterity and precision as well as a keener sense of rhythm and coordination. Improper technique is at once detected and can be corrected.

One of the principal objects which is achieved by my invention is to facilitate the instruction of code signalling by the simultaneous employment of several senses requiring a coordination of response for the proper reception of recorded signals.

Another object of the invention is to provide apparatus wherein the actions depicted by a moving image must be duplicated by the observer to detect a signal associated with that action and synchronized therewith.

A further object of the invention is to provide apparatus for the aforementioned purpose wherein an extraneous sound or signal is continuously or intermittently superimposed upon the received signal to simulate interference encountered in actual reception.

Other and further objects and advantages of the invention will be apparent from the following description and drawing wherein the single figure shows diagramatically one form of apparatus by way of illustration.

A conventional moving picture projector 10 which is adapted for synchronized sound reproduction includes a photoelectric cell 11 for scanning the sound track of the film in a manner well known in the art.

A sound amplifier circuit, indicated generally at 12, is supplied with D. C. current from a source 13. This circuit is connected to the photoelectric cell by leads 14 and 15, whereby the irregularities of the film track are translated into variations in potential of the control grid 16 of a pentode tube 17 to vary the electron flow between the cathode 18 and plate 19. The tube 17 also has a suppressor 20 and a screen grid 21 to which feedback is supplied for purpose of preventing distortion under fluctuating amplifier loads.

The output of plate 19 is impressed upon the control grid 22 of pentode tube 23 which, similarly, includes a cathode 24, plate 25, suppressor 26 and screen grid 27 with feedback connection 28. The signal impulses are thereby amplified and cause similar signal variations in the load circuit 29 which is coupled to the amplifier circuit by transformer 30. The load on the amplifier circuit is normally adjusted by a variable resistance 31 in the circuit 29.

One or more receiving circuits 32 are connected in parallel with the load circuit, each of these including head phones 33 and a telegraph key 34 in series, whereby when any key is closed signal impulses in the load circuit are audible, but will not be heard when the parallel circuit is open.

A student observing the actions of a projected image, as for example one showing the correct wrist and arm motions and positions in sending messages, endeavors to copy the observed action by similarly grasping and manipulating the key under his individual control. So long as his movements are coordinated with those of the moving image he will hear the synchronized signal corresponding to the observed action, but if his movements do not accurately follow those of the image, no signal will be detected or, if heard at all, will be fragmentary and distorted.

Instructions may be imparted by blinker lights rather than by audible signals, as for example by connecting circuit 35 into the amplifying circuit at 36. Signal impulses transmitted to the blinker light circuit operate a relay 37 to open and close the circuit through a source of alternating or direct current and thereby cause the blinker light 38 to flash. A switch 39 permits the circuit 35 to be thrown into or out of operation, as desired.

In order to simulate actual operating conditions, wherein static or other extraneous noises such as signals of different frequencies are encountered, a modulator 40 may be connected to the load circuit by action of relay 41, thereby to impress a modulated signal upon the signal impulses in the load circuit. The modulator may be continuous or intermittent in its operation, and may simulate static disturbances, or code signals other than those which the observed action illustrates.

Where instruction is given to a group of students the respective parallel circuits under their individual control will be opened and closed in unison causing sudden fluctuation in amplifier load which would be likely to set the tubes into oscillation with consequent distortion of the output. In order to obviate this the tubes 17 and 23, respectively, have the feedback connections heretofore described.

From the foregoing it will be apparent that the apparatus for instruction in telegraphy as herein disclosed rapidly develops a proficiency in the technique of code signalling. This is accomplished by the provision of individual listening circuits which may be closed so that the student hears the instruction by way of the sound track of the film and at the same time visually observes the action. In this same manner the apparatus is adapted to be used for receiving recorded code signals at speeds commensurate with the advancement of the students. In teaching the technique of sending the listening circuits are opened and closed in accordance with the observed action to receive the signals suited thereto. Deviation can be immediately detected by failure of reception, or by such fragmentary reception of signals that attention of the student is attracted at once to his imperfect response. The simultaneous stimuli to the senses of sight, touch and hearing afforded by my invention more readily coordinate the responses of the student and enable him to reach a stage of proficiency in shorter time than by previous methods of instruction.

What I claim is:

1. Apparatus for teaching telegraphy comprising means for exhibiting a moving image illustrating the technique of code signalling and simultaneously creating synchronized sound impulses, and means for receiving and exhibiting such sound impulses in the form of code signals observable in conjunction with the action depicted by the moving image.

2. Apparatus for teaching telegraphy comprising means for exhibiting a moving image illustrating the technique of code signalling and for simultaneously creating synchronized sound impulses, and manually operated means operating to open and close an electric circuit which transmits such sound impulses for selectively receiving such sound impulses in the form of signals upon such manual operation following the movements depicted by said moving image.

3. Apparatus for teaching telegraphy comprising means for exhibiting a moving image illustrating the technique of code signalling and for simultaneously creating synchronized sound impulses, and manually operated means operating to open and close an electric circuit which transmits such sound impulses for selectively receiving such sound impulses as audible signals upon such manual operation following the movements depicted by said moving image.

4. Apparatus for teaching telegraphy comprising means for exhibiting a moving image illustrating the technique of code signalling and for simultaneously creating synchronized sound impulses, and a telegraph key in circuit with a signal lamp, said telegraph key being adapted for manipulation by the user to open and close such circuit, thereby selectively exhibiting the sound impulses which are detected in observing the moving image and the sound impulses synchronized therewith.

5. Apparatus for teaching telegraphy comprising a projector for projecting an image with an associated sound record, means for detecting and amplifying the sound record as signal impulses, an associated signal circuit adapted to be opened and closed manually in accordance with movements depicted by the projected image to render the signal audible when the actions are coordinated, and a source of extraneous signal energy connected to said signal circuit to superimpose a second signal upon the signal impulses conforming to the depicted action.

6. Apparatus for teaching telegraphy comprising a projector for projecting an image illustrating the technique of code signalling, a sound record synchronized with the action depicted by such image, a photoelectric cell for scanning said sound record and thereby producing current fluctuations in an amplifying circuit, a load circuit coupled by a transformer to said amplifying circuit and receiving signal energy therefrom, series connected phones and telegraph keys connected to said load circuit in parallel therewith whereby closing of an individual key in unison with the movement depicted by the projected image results in a corresponding audible signal in its associated phone.

FORREST WESLEY LANCASTER.